United States Patent
Le et al.

(10) Patent No.: US 11,429,912 B1
(45) Date of Patent: Aug. 30, 2022

(54) SYSTEMS AND METHODS FOR GENERATING OPTIMIZED PRODUCTION PLANS ASSOCIATED WITH A SITE IN A SUPPLY CHAIN NETWORK

(71) Applicant: Coupa Software Incorporated, San Mateo, CA (US)

(72) Inventors: Tung Hoang Le, Waterloo (CA); Jiashi Song, Towcester (GB); Gary Robert Strickler, Jr., Ann Arbor, MI (US)

(73) Assignee: COUPA SOFTWARE INCORPORATED, San Mateo, CA (US)

( * ) Notice: Subject to any disclaimer, the term of this patent is extended or adjusted under 35 U.S.C. 154(b) by 0 days.

(21) Appl. No.: 17/219,685

(22) Filed: Mar. 31, 2021

(51) Int. Cl.
*G06Q 10/06* (2012.01)
*G06Q 10/04* (2012.01)

(52) U.S. Cl.
CPC ....... *G06Q 10/06313* (2013.01); *G06Q 10/04* (2013.01)

(58) Field of Classification Search
None
See application file for complete search history.

(56) References Cited

U.S. PATENT DOCUMENTS 8,214,238 B1 * 7/2012 Fairfield ............ G06Q 30/0203
705/7.29
8,266,066 B1 * 9/2012 Wezter ................... G06Q 10/06
703/20

2001/0032029 A1 * 10/2001 Kauffman ........ G06Q 10/06316
700/106

(Continued)

FOREIGN PATENT DOCUMENTS

CN 110991056 A * 4/2020 ............. G06N 3/126

OTHER PUBLICATIONS

Eskandarpour et al. "A large neighborhood search heuristic for supply chain network" (2014) (retrieved from https://hal.archives-ouvertes.fr/hal-01068286v2/file/technical_report_14-3-AUTO.pdf) (Year: 2014).*

(Continued)

*Primary Examiner* — Sujay Koneru
(74) *Attorney, Agent, or Firm* — Baker Botts L.L.P.

(57) ABSTRACT

Input data comprises a particular quantity of one or more finished goods to be produced over a time period. Software is programmed for: accessing infrastructure data that defines an infrastructure of a particular production facility; generating one or more sequence-dependent production plans comprising a particular sequence of one or more production process steps; calculating one or more optimized production plans for the time period by: determining a sub-period optimization plan for a first sub-period by adjusting one or more of a plurality of binary variables; generating a neighborhood optimization plan by adjusting one or more of the plurality of binary variables for a predefined neighborhood; and generating a particular optimized production plan for the time period by adjusting one or more of the plurality of binary variables; filtering the one or more optimized production plans based on one or more filtering criteria; and outputting the optimized production plans for display.

14 Claims, 8 Drawing Sheets

(56) References Cited

U.S. PATENT DOCUMENTS

| | | | |
|---|---|---|---|
| 2006/0282346 A1* | 12/2006 | Kernodle | G06Q 10/08 705/28 |
| 2008/0015721 A1* | 1/2008 | Spearman | G06Q 10/06 705/28 |
| 2009/0150208 A1* | 6/2009 | Rhodes | G06Q 10/087 705/28 |
| 2009/0319070 A1* | 12/2009 | Morningred | G06Q 10/06 705/29 |
| 2009/0327027 A1* | 12/2009 | Bateni | G06Q 10/087 705/7.31 |
| 2011/0098834 A1* | 4/2011 | Couronne | G06Q 10/06 700/100 |
| 2011/0130857 A1* | 6/2011 | Budiman | G06Q 50/04 700/104 |
| 2011/0282476 A1* | 11/2011 | Hegemier | G06Q 10/087 705/26.5 |
| 2012/0072431 A1* | 3/2012 | Berlener | G06Q 30/06 707/E17.084 |
| 2012/0253865 A1* | 10/2012 | Narasimhamurthy | G06Q 10/0631 705/7.12 |
| 2015/0100365 A1* | 4/2015 | Torkian | G06Q 10/083 705/7.19 |
| 2015/0120373 A1* | 4/2015 | Bajaj | G06Q 10/0635 705/7.25 |
| 2019/0188621 A1* | 6/2019 | Nasu | G06Q 10/06315 |
| 2021/0158259 A1* | 5/2021 | Evans | G06Q 10/06375 |
| 2021/0256443 A1* | 8/2021 | Srivastava | G06Q 10/067 |

OTHER PUBLICATIONS

Barbaro, R.W. et al. "Generalized Multiperiod MIP Model for Production Scheduling and Processing Facilities Selection and Location," "Technical Papers," Mining Engineering, SME preprint 83-123, SME-AIME Annual Meeting, Atlanta, GA, Mar. 1983. Manuscript Jan. 1983. Feb. 1986, pp. 107-114 (8 pgs).

Maravelias, Christopher T., "Mixed Integer Programming Methods for Supply Chain Optimization," Chemical and Biological Engineering, University of Wisconsin, Madison, WI 53706, USA, for "PASI 2011," Jul. 19-29, 2011, Angra dos Reis, RJ, Brazil, 187 pages.

Georgiadis, Georgios P. et al., "Optimization-Based Scheduling for the Process Industries: From Theory to Real-Life Industrial Applications," "Processes 2019," 7,438; doi: 10,3390/pr7070438, www.mdpi.com/journal/processes, Received: May 27, 2019, Accepted: Jul. 4, 2019; and Published Jul. 10, 2019, pp. 1-35.

* cited by examiner

SYSTEMS AND METHODS FOR GENERATING OPTIMIZED PRODUCTION PLANS ASSOCIATED WITH A SITE IN A SUPPLY CHAIN NETWORK

TECHNICAL FIELD

One technical field of the present disclosure is computer-implemented spend management systems and e-procurement systems offered as software as a service (SaaS). Another technical field of the present disclosure is computer-implemented algorithms for supply chain management including determining optimal production plans for a site or a subset of sites that comprise a supply chain network.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Supply chain networks or other modeling techniques are often used to analyze and optimize shipping and production by predicting the best combinations of sites, for example distribution centers, suppliers, vendors, and manufacturers (along with work centers within individual sites), to utilize to meet consumer demand for a particular finished good. Supply chain network techniques often employ multiple levels of interdependence and connectivity between sites within the supply chain network. Multiple models or techniques may be utilized to predict the behavior and interactions between these sites to optimally deliver goods and services to various points or locations along the supply chain network.

Individual sites within a supply chain network, for example manufacturing or production facilities, often feature complex interdependence and connectivity within the site due to multiple finished goods that may be manufactured at the site. The interactions between existing inventory, demand for finished goods, supply of raw materials, production processes each having a plurality of production process steps, production periods, available site resources (e.g., workers, technicians, etc.) and on-site equipment that must be managed at a particular site may result in inefficiencies and significant unnecessary expenses if these variables are improperly managed. Thus, an entity may incur excess use of materials, power, chemical resources, machine time, or other physical effects at individual sites along a typical supply chain, stemming from inefficient processes or failure to consider internal and external factors that impact a particular site.

An effective solution requires computer implementation to manage issues of scale and real-time response timing that accounts for factors both internal and external to particular sites in a supply chain network. In some environments, buyer computers or buyer accounts may interoperate with dozens to hundreds of different supply chains, each with dozens to hundreds of nodes, in association with thousands to tens of thousands of products or components. Each node in all these complex supply chains may be associated with different production requirements. Even given this level of complexity, buyer computers require real-time responses to queries about applicable costs and production campaigns or plans. Buyer accounts need the ability to add, delete, or rearrange supply chain nodes or production nodes, while receiving a real-time response to an updated query for an optimized plan or campaign and/or costs associated with parts, components, or a complete product, so that other workflows or transactions can proceed or be uninterrupted without delay or the introduction of race conditions.

Fulfilling these requirements with a human-based solution has become impractical. If a solution could provide automated means of managing millions of data items, while still supporting real-time response, it would represent a practical application of machine-based computing technology that should gain widespread use across industry.

SUMMARY

The appended claims may serve as a summary of the invention.

DETAILED DESCRIPTION

Figure 1A:
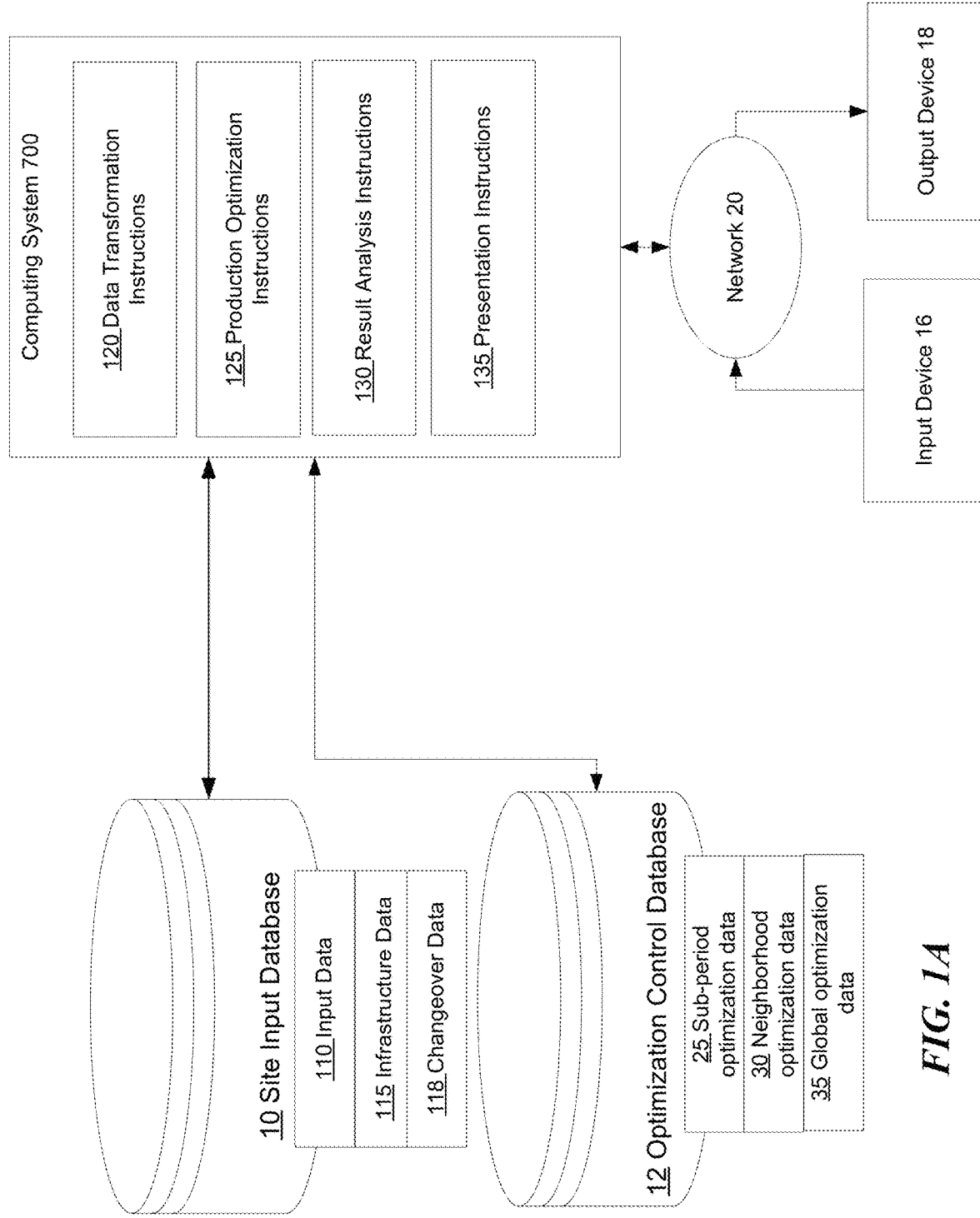
FIG. 1A illustrates an example distributed computer system with which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
1. General Overview
2. Structural & Functional Overview
3. Implementation Example—Hardware Overview
4. Extensions and Alternatives

1. General Overview

Embodiments provide computer-implemented methods, and stored program computer systems, capable of generating production plans for a site or subset of sites. In particular embodiments one or more of these sites may be part of a larger supply chain network. Embodiments may be programmed to calculate a plurality of production plans from input data and infrastructure data and to dynamically calculate and/or update costs of production, storage, and similar productions at a particular site or subset of sites. User input or programmatic input may specify an arbitrary quantity of a finished good, inventory requirement, or a starting point of a commodity in the complex supply chain and an arbitrary ending point, and the methods and systems are programmed to automatically calculate optimal production plans to fulfill the order for the finished good or other user input.

In one embodiment, a computer-implemented method of providing a real-time response to a production planning query concerning a production of physical products using a plurality of production processes each having a plurality of production process steps, production periods, and production facilities (e.g., a site or group of sites), each of the production process steps having multiple changeover cost values and inventory cost values, comprising receiving input data comprising a particular quantity of one or more finished goods over a time period, the one or more finished goods each comprising one or more raw materials; accessing infrastructure data that defines an infrastructure of a particular production facility among the plurality of production facilities; generating, based on the infrastructure data and the input data, one or more production plans that produce the particular quantity of the one or more finished goods over the time period, the one or more production plans comprising a plurality of binary variables including at least the changeover cost values and the inventory cost values; based on the one or more production plans, calculating one or more optimized production plans for the time period by, for each of the optimized production plans: determining a sub-period optimization plan for a first sub-period of the time period by adjusting one or more of the plurality of binary variables over the first subperiod; generating, using the sub-period optimization plan, a neighborhood optimization plan by adjusting one or more of the plurality of binary variables for a predefined neighborhood; and generating, using the neighborhood optimization plan, a particular optimized production plan for the time period by adjusting one or more of the plurality of binary variables over the time period; filtering the one or more optimized production plans based on one or more filtering criteria to produce a reduced subset of the optimized production plans; and outputting the reduced subset of the optimized production plans for display on a client device.

2. Structural & Functional Overview

In the following description, the following terms have the following meanings.

As used herein, "finished good" or "FG" as used in accordance with the present disclosure refers to any product or its derivatives that has completed the manufacturing process and is ready to be sold, offered for sale, or otherwise distributed to the general public. A finished good may have a bill of materials ("BOM"), which describes the composition of a finished good. A finished good may be composed of one or more raw materials, one or more other finished goods, or any combination of the aforementioned. For example, a finished good may be a candle, which comprises wax (a raw material), a wick (a raw material), and a glass jar (a finished material, comprising sand (a raw material), soda ash (a raw material), and limestone (a raw material)).

As used herein, "raw material" or "RM" as used in accordance with the present disclosure refers to any unprocessed or unmanufactured material, or a minimally processed or minimally manufactured material used to create a finished good. One or more raw materials may be used to manufacture a finished good. For example, a raw material may include latex, water, sand, latex, soda ash, cotton, iron, silver, clay, or similar.

As used herein, "Customer Zone" or "CZ" as used in accordance with the present disclosure refers to the location of demand in the network path, it may be any port of entry, free trade zone, customs zone, or other destination at which customs duties are assessed or charged for goods or commodities, and/or any entity associated with such a destination, such as a customs broker. A CZ may receive one or more finished goods from one or more distribution centers. Further, a CZ can represent an individual location or a group of locations in proximity. For example, CZs may represent sites in a supply chain network for a particular state or postal code region. One or more CZs may represent sites in a supply chain network for a particular finished good, or a group of finished goods.

As used herein, "distribution center" or "DC" as used in accordance with the present disclosure refers to any location, business, or other entity where one or more finished goods are stocked, stored, and managed prior to shipping finished goods to the one or more CZs (e.g., a warehouse). A distribution center may receive one or more finished goods from one or more manufacturers. For example, a distribution center may receive a candle. One or more distribution centers may represent sites in a supply chain network for a particular finished good, or a group of finished goods.

As used herein, "manufacturer" or "MFG" as used in accordance with the present disclosure refers to any location, business, or other facility where one or more raw materials ("RM") and/or one or more finished goods are received and used to produce or manufacture one or more finished goods (e.g., a production facility or manufacturing facility). A manufacturer may receive one or more raw materials or one or more finished goods from suppliers, vendors, or other manufacturers, For example, a manufacture may receive wax (a raw material), a wick (a raw material), and a glass jar (a finished good) to manufacture and produce a candle. One or more manufacturers may represent sites in a supply chain network for a particular finished good, or a group of finished goods.

As used herein, "supplier" as used in accordance with the present disclosure refers to any location, business, or other entity that provides goods or services to a manufacturer. A supplier may receive one or more raw materials from one or more vendors, other suppliers, or from one or more manufacturers, and send them to one or more manufacturers or suppliers. One or more suppliers may represent sites in a supply chain network for a particular finished good, or a group of finished goods.

As used herein, "vendor" as used in accordance with the present disclosure refers to any location, business, or other entity that makes or procures raw materials for sale. One or more vendors may represent sites in a supply chain network for a particular finished good, or a group of finished goods.

Individual sites (e.g., production facilities, manufacturing facilities, CZ, DZ, vendors, suppliers, etc.) within supply chain networks often involve interconnected and dependent complexities, due to both internal factors (e.g., available equipment, inventory, cleanup time, scheduled downtime and maintenance, manpower, etc. to meet production demands for multiple finished goods that may be produced or travel through a particular site) and external factors (e.g., market demand, transportation logistics, available supply of raw materials, etc.). Each of these factors is relevant to the operation and optimization of a particular site in the supply chain network, and if improperly managed can lead to inefficiencies within an individual site. Consumers today seek solutions that permits them to produce finished goods at a site while maximizing revenue and utilization rates while minimizing costs and hold times. To approximate these solutions, consumers will identify constraints that may describe the operation of the site, including for example and not by way of limitation capacity constraints, shared resources at the site, cleanup times and setup times (e.g., changeover times), release time of finished goods, minimum campaign sizes for a particular finished good, frozen periods, lead times, and stock requirements. Existing solutions often rely on manually created spreadsheets or commercial mixed-integer programming (MIP) solvers that incorporate these constraints, simplistic forecasting techniques, financial planning, and employee intuition to arrive at a production plan that best utilizes the available resources at a particular site. The may result in site outputs or even entire supply chain network outputs that are unduly costly or even unfeasible.

However, these methods are impractical if not impossible given the complexity of modern sites and the time-sensitive nature of such decisions to meet modern supply chain network demands. Given the fast pace of modern industry, it is often impossible to fully explore all possible solutions before a condition in the supply chain network changes, or to even arrive at a feasible solution which does not violate these complex constraints. For example, new orders for quantities of raw materials or finished goods may be received instantaneously, making it impossible to timely update manually created solutions. Further, the complex interactions between time periods (e.g., a week, month, year, etc. of production) and between finished goods or raw materials at a particular site may not be properly accounted for in existing techniques. As another example, existing site limitations (e.g., equipment limitations, manpower limitations, changeover time between production of different finished goods, etc.) may be difficult to quantify and account for with manual modeling techniques. Moreover, these methods often do not consider an optimal solution and are frequently prone to errors. These limitations and resulting inefficiencies grow exponentially as the size of a site increases. Moreover, inefficient decisions made at one junction at a particular site for a particular time period may compound and create greater inefficiencies in other time periods, or at other sites along the supply chain network. This may result in site outputs or even entire supply chain networks outputs that are unduly costly or even unfeasible.

Further, the complexities of these site models often require substantial computing power and resources to operate. For example, a particular site may manufacture dozens of finished goods that require hundreds of different raw materials. The resulting site complexity may require thousands to millions of iterations to generate an optimal production plan for a particular site. To efficiently generate an optimal production plan, advanced processing equipment, large storage capacity, memory, and power may be required to quickly process and produce optimal production plans for a particular site. Additionally, consumers or site managers may require customizable and detailed constraints unique to the site (e.g., equipment considerations, cleanup costs, available manpower, or other variables specific to a site) to provide a feasible and accurate solution that is tailored to the individual consumer. This customized detail enables optimization of complex interconnectivity of multiple variables defining a particular site, for example a manufacturer that receives a vast array of raw materials and produces a plethora of different types of finished goods.

Embodiments disclosed herein provide real-time solutions to produce optimized production plans for a site based on provided internal and external factors, for example and not by way of limitation, market demand, production costs, inventory holdings, and available internal resources (e.g., manpower, equipment, etc.). These sites may be included as part of a larger supply chain network. These techniques allow for maximized customer demand fulfilment while optimizing costs and inventory holdings for a particular site. These solutions may be particularly valuable to manufacturing and production facilities, although these solutions can be applied to any site that produces, processes, handles, or stores one or more finished goods or raw materials, for example a distribution center, supplier, vendor, or other similar site. Further, provided solutions may be particularly relevant for sites that frequently shift between processes, or handles multiple types of finished goods or raw materials over different periods using the same equipment. Embodiments disclosed herein provide solutions to capacitated lot sizing problems by planning appropriate lot sizes of multiple finished goods or raw materials with the objective of meeting demands while minimizing setup times and costs, and inventory holding times and costs for a particular site. For example, the embodiments disclosed herein may be particularly valuable to sites that produce, process, handle, or store food products, beverage products, chemicals, or pharmaceuticals using the same equipment, workstations, or other assets within the site.

In an embodiment, a computing system is programmed to receive input data comprising a desired quantity of one or more finished goods to be produced over a time period, including information regarding the finished good, one or more raw materials comprising the finished good, and information regarding a site or subset of sites (e.g., a production facility or similar). The computing system is programmed to access infrastructure data that defines an infrastructure of a production facility. Using this data, the computing system is programmed to generate one or more production plans that produce the desired quantity of the one or more finished goods over the time period. The production plan may include specific production processes, each having a plurality of production process steps, and production periods, that should be implemented that the production facility to fulfill the order for the quantity of finished good. The computing system may also be programed to optimize the production plans for particular time periods, sub-periods of the time period, and neighborhoods that define certain commonalities between the finished goods, raw materials, sites, equipment, workstations, or other input data. The optimal result may include for example, one or more paths along the optimized production plans that minimize costs, and maximizes revenues, profitability, utilization rates, or other criteria incurred while fulfilling the order. In some embodiments a heuristic method may be used to select high priority production plans to handle the exponential growth of production plans for a complex site or finished good. In this manner, a consumer can quickly and efficiently fulfill multiple orders while reducing costs and meeting the needs of their customers.

FIG. 1A illustrates an example distributed computer system with which an embodiment may be implemented. In the example of FIG. 1A, a computing system 700 is communicatively coupled to a site input database 10, optimization control database 12, and network 20. Computing system 700 may have the structure of FIG. 7, or may comprise one or more computers, servers, and/or virtual machine instances in any of public and private datacenters and/or cloud computing facilities. In one embodiment, computing system 700 is a virtual machine instance of a multi-tenant, SaaS-based spend management system, or interoperates with such a system.

Site input database 10 may comprise a relational database system, flat file system, object database, or other repository that is programmed to store structured data in one or more tables or other data structures. In one embodiment, site input database 10 stores input data 110, infrastructure data 115, and changeover data as further described herein in relation to FIG. 1, FIG. 2, and FIG. 3.

Optimization control database 12 may comprise a relational database system, flat file system, object database, or other repository that is programmed to store structured data in one or more tables or other data structures. In one embodiment, optimization control database 12 stores sub-period optimization data 25, neighborhood optimization data 30, and global optimization data 35 as further described herein in relation to FIG. 4 and FIG. 5.

In one embodiment, computing system 700 is programmed to execute data transformation instructions 120, production optimization instructions 125, result analysis instructions 130, and presentation layer instructions 135. For example, data transformation instructions 120 may be programmed to correspond to the algorithm or method 100 of FIG. 1, FIG. 2, and FIG. 3, production optimization instructions 125 may be programmed to correspond to FIG. 4, the method 500 of FIG. 5 and method 600 of FIG. 6. Result analysis instructions 130 are programmed to receive digital data input from one or more input devices 16 and to format output data for transmission to output device 18 for rendering at the output device. For example, presentation layer instructions 135 may be programmed to generate dynamic HTML for presentation as web pages at output device 18 as part of delivering execution of instructions 100, 600 as SaaS.

Computing system 700 also may comprise non-volatile storage and/or volatile memory for use in storing working copies of the tables and other data structures that are further described herein in relation to FIG. 2, FIG. 3, FIG. 4, FIG. 5, FIG. 6. Thus, each of FIG. 2, FIG. 3, FIG. 4, FIG. 5, FIG. 6 graphically illustrates electronic data that is digitally stored at least transiently during access, calculations, transformation, and output in one or more of volatile or non-volatile digital computer memory.

Input device 16, output device 18 may be associated with a user account that is maintained in computing system 800, or other elements of a SaaS spend management system, and accessed using dynamically generated web pages via network 20. The network 20 broadly represents one or more local area networks, wide area networks, internetworks, or a combination thereof using any of terrestrial or satellite, wired or wireless network links.

Figure 1B:
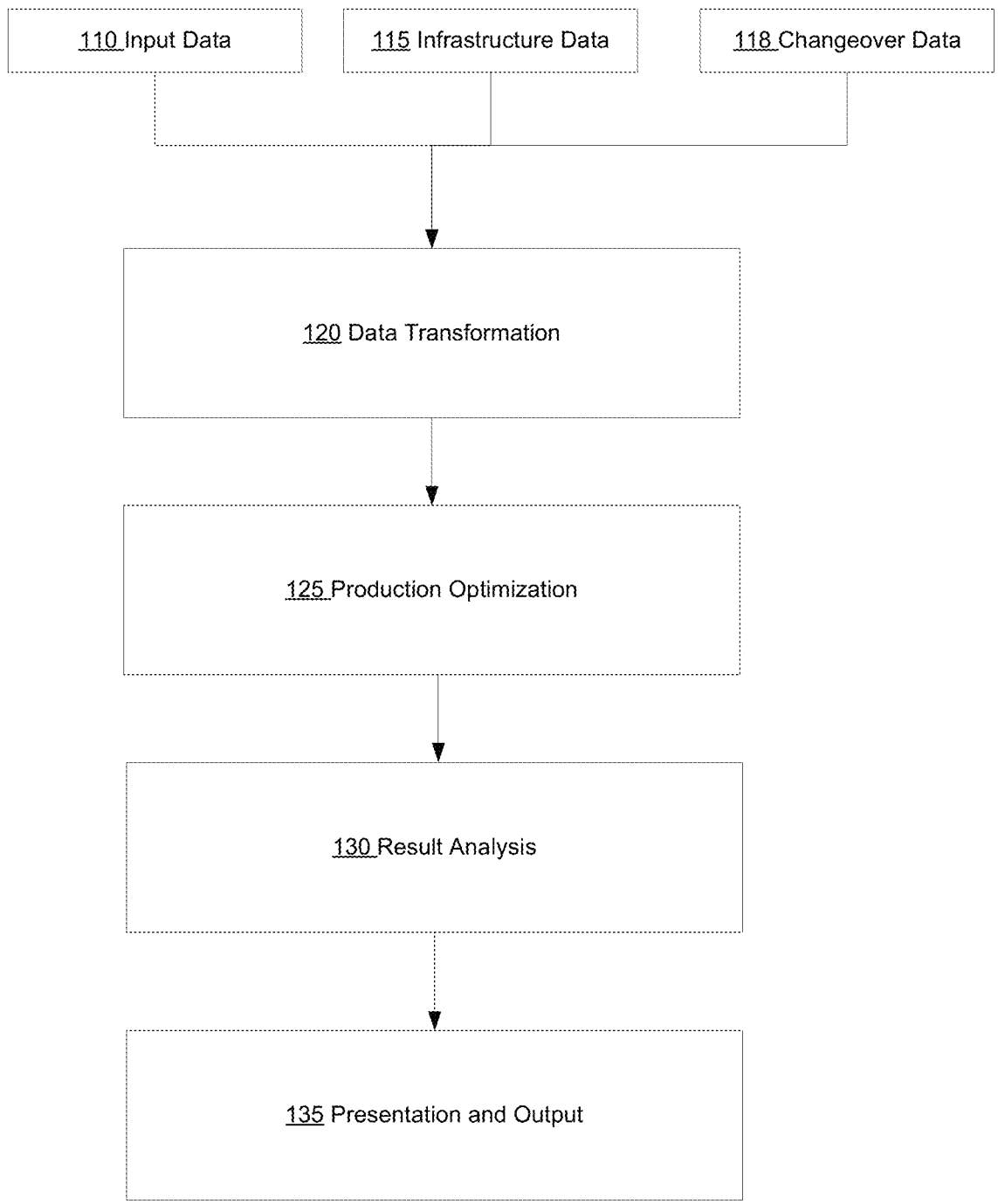
FIG. 1B illustrates an example computer-implemented method for generating an optimal production plan.

FIG. 1B illustrates an example computer-implemented method for generating an optimal production plan.

In the example of FIG. 1B, a method 100 begins execution at step 120 at which a computing system may transform received input data 110, infrastructure data 115, and changeover data 118.

Using this information, at step 125 the computing system is programmed to generate one or more optimized production plans. At step 130, the computing system is programmed to analyze the results of the one or more optimized production plans based on predetermined user criteria. Using these rankings, the computing system is programmed to generate an output at step 135 comprising one or more optimized production plans that describe an optimal way to produce a quantity of finished goods at a particular site or group of sites. For example, the production plans may include a set of production processes each having a plurality of production process steps, for one or more production periods.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates an example method for generating an optimal path solution including the particular steps of the method of FIG. 1, this disclosure contemplates any suitable method for generating an optimal path solution including any suitable steps, which may include all, some, or none of the steps of the method of FIG. 1, where appropriate. Furthermore, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1.

In particular embodiments the computing system may be programmed to receive input data comprising a particular quantity of one or more finished goods to be produced over a time period. Input data may further comprise information unique to an individual site or sites, or unique to a particular time period, which may comprise quantities of raw materials sent or received from the site during particular time periods, inventory of one or more finished goods or raw materials at the site at the beginning or end of one or more time periods, minimum campaign sizes for a particular finished good, safety or strategy stock requirements, lead times or transportation times to procure finished goods or raw materials, a desired produced quantity of one or more finished goods at the end of a particular time period, a frozen period for particular products or SKUs that restricts availability of modules, equipment, workstations, or assets at the site during a particular time period (due to e.g., prescheduled productions of finished goods, or limited resources of trained staff, equipment or workstations limitations, or other factors). Input data may further comprise anticipated downtimes during a time period, which can either be internal (e.g., planned downtime, scheduled maintenance, etc.) or external (e.g., national holidays, weekends, etc.). In particular embodiments, input data may comprise a release time of a particular finished good. A release time may comprise a period of time after completion of production of a particular finished good before it can be shipped or utilized in another application (e.g., time to test a production batch of finished goods, perform quality control or quality assurance prior to using a particular batch of finished good in a subsequent stage of production, etc.).

In particular embodiments input data may further comprise costs associated with production of one or more finished goods, for example materials costs, number of workers required to operate a particular module or equipment, production times, or other defined filters or criteria that describe specific conditions or costs associated with a particular site or production of a particular finished good. In particular embodiments these costs may be manually provided by the consumer, or they may be automatically determined by accessing a table or database that describes finished goods, equipment, workstations, or modules (e.g., a table of run rates or output rates for a particular piece of machinery at the site).

Input data may further comprise one or more conditions, limitations, descriptions, or data to describe the architecture of the site used to produce the quantity of finished goods, data comprising the composition of one or more finished goods (e.g., a BOM), along with a list of one or more predetermined criteria to optimally complete the order (e.g., at the lowest cost, quickest speed, lowest ending inventory, etc.).

In particular embodiments the computing system may be programmed to process the input data to identify missing data or errors. In some embodiments the received input data may be incomplete and may require augmentation in order to generate optimized production plans. As an example, the input data may lack a BOM or relational matrix for one or more finished goods that are desired to be produced. The computing system may attempt to augment or supplement this data, by accessing data tables that define for example and not by way of limitation known properties of finished goods, raw materials, modules, equipment, workstations, calendars, or sites. The computing system may use any suitable method for augmenting or supplementing missing data or correcting errors in the data, for example and not by way of limitation, using a default value, empirical data analysis, data interpolation, extrapolation, or other statistical analysis, or machine learning techniques.

In particular embodiments the computing system may be programmed to process the input data to augment the data to generate higher quality and more accurate input data. In some embodiments the computing system may be capable of generating optimized production plans with the received input data, but additional data may be augmented to improve the quality of the data. As an example, the consumer may have provided input data representing a particular order for a finished good. However, the consumer's input data for a particular order may have failed to include one or more of product values for a particular finished good or finished good family. In particular embodiments the computing system may attempt to augment or supplement this data, for example by accessing the input data representing the default values. Default values may further define, for example and not by way of limitation, known properties of finished goods, raw materials, SKU data, modules, equipment, workstations, calendars, or sites. The computing system may use any suitable method for augmenting or supplementing missing data or correcting errors in the data, for example and not by way of limitation, using a default value, empirical data analysis, data interpolation, extrapolation, or other statistical analysis, or machine learning techniques. In some embodiments the computing system may further or alternatively generate a message or warning to the consumer that highlights potential inconsistencies and issues in the input data, by comparing the input data to one or more default values. In particular embodiments the consumer may be responsible for manually augmenting or correcting the input data, or the computing system may automatically augment or correct the input data.

In particular embodiments the computing system may be programmed to access infrastructure data 115. The infrastructure data may be accessed in real-time from a second computing device associated with the site (e.g., a server), or it may be manually provided by the consumer (e.g., it may be received as part of the input data). Infrastructure data comprises information that defines an infrastructure of a site (e.g., a particular production facility) among a plurality of sites (e.g., one or more production facilities, manufacturers, distribution centers, etc.), including for example a run rate, production rate, or utilization rate of one or more modules, equipment, workstations, or assets at the site during a particular time period, the number of available workers on site during a particular time period, or a changeover time to convert and setup one or more modules or pieces of equipment or workstations from producing one type of finished good to another type of finished good. In particular embodiments infrastructure data further comprises a production facility matrix.

Figure 2:
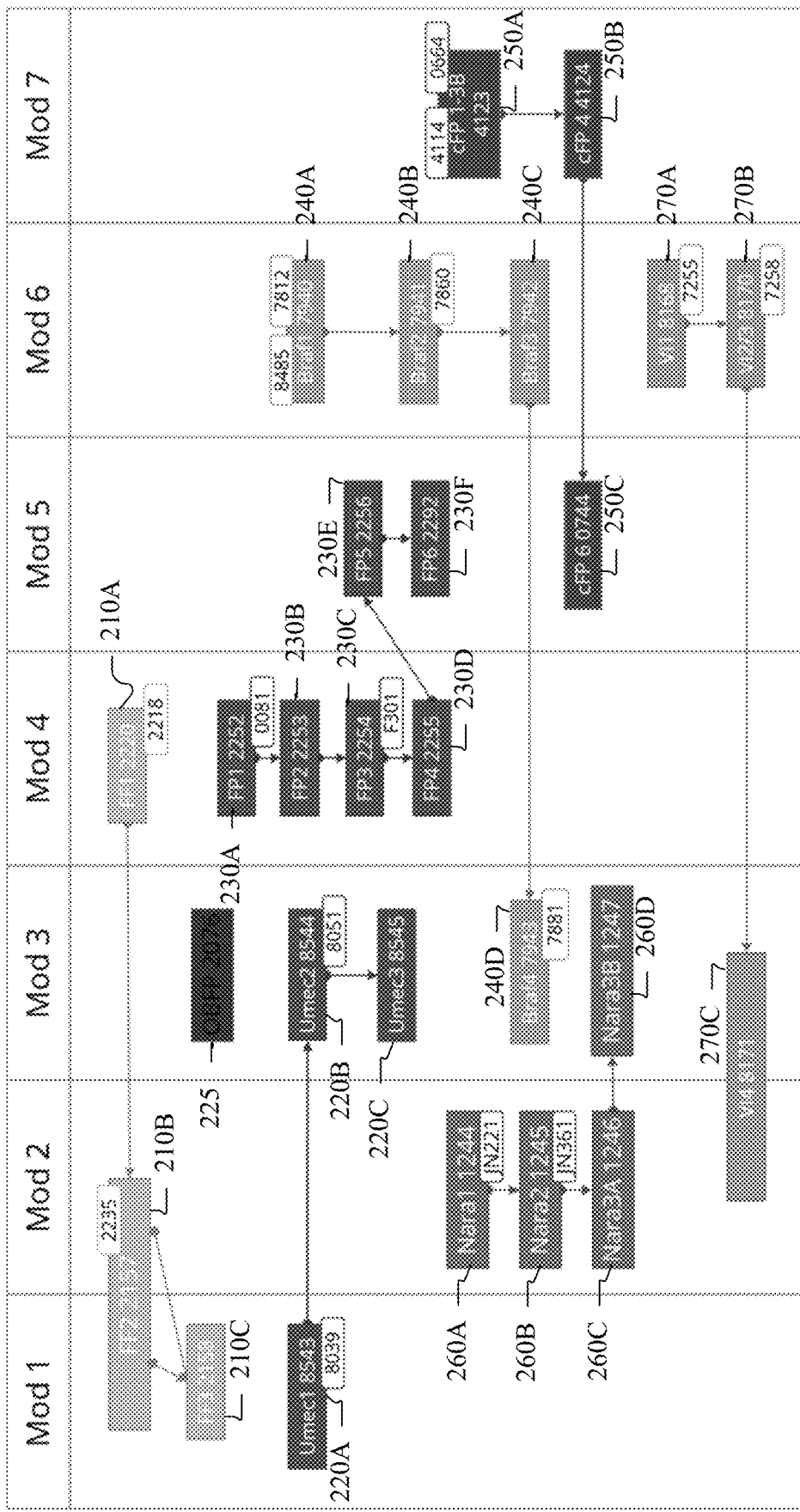
FIG. 2 illustrates an example production flow matrix of a site.

FIG. 2 illustrates an example production flow matrix of a site. Production facility matrix 200 may comprise one or more modules ("Mod"), which represent a set of infrastructure, machinery, workstations, or other resources that can be used to produce one or more raw materials and finished goods 210-270. For example, FIG. 2 illustrates a site with seven modules, each of which is capable of simultaneously producing one or more finished goods. Production flow matrix 200 may also comprise one or more finished goods 210-270 that can be produced by one or more modules at the site. As further illustrated, certain modules may be limited to producing certain finished goods or certain types of finished goods. For example, as illustrated in FIG. 2, module 1 may be limited to production of finished goods 210B, 210C, and 220A. In some embodiments certain finished goods may require two or more modules to produce, or may be simultaneously produced on multiple modules (based on available resources, workers, etc.). For example, as illustrated in FIG. 2, Module 1 and Module 2 may be required to produce finished good 210B, and Module 2 and Module 3 may be required to produce finished good 270C. Production flow matrix 200 may further comprise relational data of one or more finished goods. For example, in some embodiments one finished good may be used to produce a second finished good. For example, Module 6 may be used to produce finished good 240A, which in turn may be used to produce finished good 240B, which in turn may be used to produce finished good 240C. Finished good 240C may be transported to Module 3, where it may be used to produce finished good 240D. Although FIG. 2 illustrates several examples of relational data between one or more finished goods, the provided examples are merely meant to illustrate possible relationships between finished goods and are not exhaustive. In particular embodiments a consumer of the production plans may be affiliated or associated with one or more sites of a supply chain network (e.g., owning, leasing, operating, contracting, or otherwise having a business relationship with one or more sites). Although FIG. 2 illustrates a production flow matrix 200 in a tabular format, in some embodiments a production flow matrix may be provided in any suitable format for providing the infrastructure of a particular site or production facility.

Figure 3:
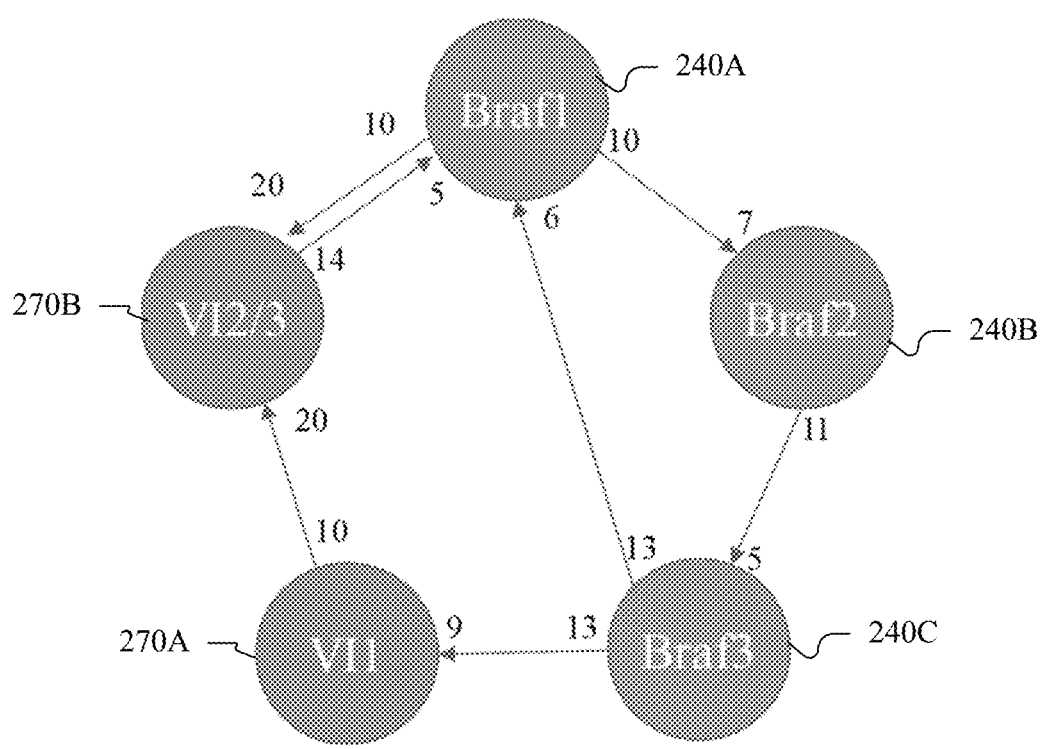
FIG. 3 illustrates an example changeover matrix for a particular site.

In particular embodiments the computing system may be programmed to further access changeover data 118. FIG. 3 illustrates a changeover matrix for a particular site. In particular embodiments changeover data 118 may be provided as part of input data 110 or infrastructure data 115, or it may be included independently. In particular embodiments input data may further comprise a changeover matrix that represents the amount of time and cost to transition a module, equipment, workstation, or similar from production of one finished good to another. FIG. 3 illustrates the changeover matrix for the finished goods that can be produced by Mod. 6 in FIG. 2. In particular embodiments a changeover matrix may comprise both a cleanup time and a setup time to transition from production of one finished good to another. For example, FIG. 3 illustrates that, when transitioning Mod. 6 from producing finished good 240A to finished good 240B, it takes 10 days to cleanup Mod. 6 after production of finished good 240A, and an additional 7 days to setup Mod. 6 for production of finished good 240B. Both the cleanup and setup times may differ depending on the sequence of finished goods produced on the particular equipment, workstation, module, etc. While not depicted in FIG. 3, in particular embodiments a changeover matrix may further or alternatively comprise information related to the cost of changeover. The particular costs associated with changeover may differ depending on the sequence of finished goods produced on the particular equipment, workstation, module, etc. In particular embodiments the computing system may utilize one or more changeover matrices as part of the input data to generate an optimal sequence of finished goods for production on a particular module in order to minimize the total time required for changeover (e.g., setup and cleanup) during a particular period. In particular embodiments the computing system may utilize the changeover matrix to determine an average value of the changeover times and costs on a per product per workstation basis prior to optimization.

In particular embodiments the computing system may be programed to generate one or more production plans based on the input data and infrastructure data that when implemented at the site produce the particular quantity of the one or more finished goods over a desired time period. The production plan may further detail one or more production processes, each having a plurality of production process steps, which need to be implemented at the site. In particular embodiments the one or more production plans may comprise a plurality of binary variables, including at least binary variables that define changeover cost values at the site, and inventory cost values of a particular production plan. In particular embodiments the production plans may further comprise one or more binary variables that constrain each module, asset, or similar equipment at a site to produce only one finished good during a time period. In some embodiments, the production plan may further comprise one or more binary variables in the production plan that limit the size and number of campaigns during a particular time period. A campaign for a particular finished good may be defined as a duration of time, which may span one or more consecutive time periods in which a finished good is produced without changeover of modules, equipment, workstation, or other assets. Thus, changeover of a module, equipment, or other asset at a site only occurs after the completion of a campaign involving that particular module, equipment, workstation, or other asset.

In particular embodiments the computing system may generate one or more production plans based on one or more equations that define processes, finished goods, production steps, and periods at one or more sites. Each production plan may comprise a particular sequence of production process steps. The particular order of production process steps as implemented may impact the costs, profitability, and time associated with fulfilling an order. For example, PRODUCTS may be a set of all raw materials and finished goods to be produced, PROCESSES may be defined as a set of all processes to produce the raw materials and finished goods, PROCESS_STEPS may be defined as a set of all production steps at a site necessary to produce a quantity of raw materials and finished goods, PERIODS may be defined as a set of periods during which a quantity of raw materials and finished goods must be produced, and FACILITIES may be defined as set of all site locations. In particular embodiments the binary decision variable PRODUCE(f,p,PR,$PR_{step}$,t)=1, if production step $PR_{step} \in$ PROCESS_STEPS of process PR$\in$PROCESSES at site f$\in$FACILITIES is used to make product p$\in$PRODUCTS during period t$\in$PERIODS. Otherwise, this binary decision may be set to zero in a particular production plan.

In particular embodiments the campaign duration of a particular raw material or finished good on a particular module, equipment, or asset may be defined by the binary decision variables startProdPeriod and endProdPeriod, which define the start and end of a production campaign, respectively. These variables thus dictate the campaign duration and potential changeovers in a particular production plan.

In particular embodiments the binary decision variable startProdPeriod(f,p,PR,$PR_{step}$,t)=1 if product p$\in$PRODUCTS is started for production by production step $PR_{step} \in$PROCESS_STEPS of process PR$\in$PROCESSES at site f$\in$FACILITES at period t$\in$PERIODS. Otherwise, this binary decision may be set to zero in a particular production plan.

In particular embodiments the binary decision variable endProdPeriod(f,p,PR,$PR_{step}$,t)=1 if product p$\in$PRODUCTS is stopped for production by production step $PR_{step} \in$PROCESS_STEPS of process PR$\in$PROCESSES at site f$\in$FACILITES at period t$\in$PERIODS. Otherwise, this binary decision may be set to zero in a particular production plan.

In particular embodiments the computing system may be programmed to utilize one or more of these variables, along with the input data and infrastructure data, to determine one or more production plans, which may comprise production processes each having a plurality of production process steps, along with total changeover and inventory costs associated with a particular production plan. Each production plan may comprise a particular sequence of production process steps. The particular order of production process steps as implemented may impact the costs, profitability, and time associated with fulfilling an order. In particular embodiments these variables and inputs may be formulated through, for example, a network optimization model. In an embodiment, the network optimization model executes using a maximization function; the general use of maximization functions in other domains and for other purposes is a well-understood aspect of statistical programming and therefore this disclosure need not detail the structure or use of maximization functions as they are known to those of skill in the relevant arts. In an embodiment, an objective of the network optimization model is to determine values of the flow variables so that the profit of the network is maximized.

For example, a consumer may wish to fulfill a particular order while incurring the lowest costs or achieving the highest revenue. An output of the network optimization model may be a large mixed integer programming (MIP) formulation.

Existing MIP solving solutions may be unable to provide optimal solutions for this output, due to the size, complexity, and required resources to provide for an optimal solution. Instead, in particular embodiments, the computing system may be programmed to calculate one or more optimized production plans for a time period. The optimized production plans may be based on the generated production plans. In particular embodiments, the computing system may utilize a three-phased sequential approach to calculate one or more optimized production plans for a particular time period. In a first phase, the computing system may be programmed to determine an initial optimal production plan by maximizing revenue for one or more sub-periods of the desired time period (e.g., initial optimal production plan for a day of a week-long time period). In a second period, the computing system may be programed to generate a neighborhood optimization plan using the initial optimal production plan generated during the first period. In a third phase, the computing system may be programmed to generate an optimized production plan for the entire time period using the neighborhood optimization plan. In the optimization phase, the goal is to create a production plan that optimizes one or more variables, for example, maximizing customer revenue, minimizing total changeover and inventory cost, or any other variable that may be important to the consumer.

Figure 4:
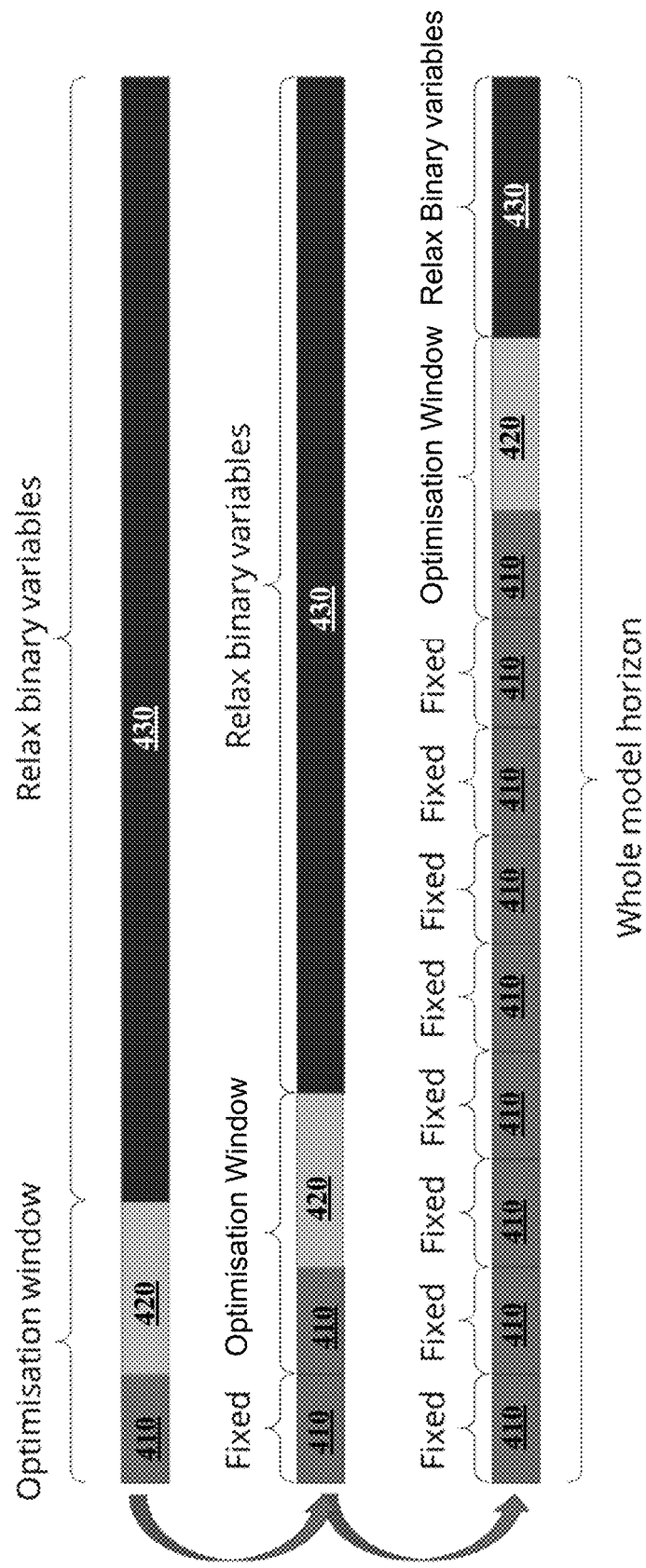
FIG. 4 illustrates a process for determining a sub-period optimal production plan for successive sub-periods of the time period.

FIG. 4 illustrates a process for determining a sub-period optimal production plan for successive sub-periods of the time period. At this first phase, the computing system may find a sub-period optimal production plan by solving problems over a series of smaller and overlapping optimization sub-periods or windows (e.g., a rolling horizon). In particular embodiments the computing system may use one or more generated production plans as an input, and iteratively adjust and fix one or more binary variables over a series of smaller and overlapping optimization windows within the production plan (e.g., a smaller sub-period of the overall time period). The computing system can thus break up the entire period into one or more sub-periods, and assign each sub-period as one or more fixed sub-periods 410 (e.g., when the binary variables are fixed), one or more optimization sub-periods 420 (e.g., when one or more binary variables are optimized), and one or more relaxed sup-periods 430 (e.g., when one or more binary variables are continuous). An advantage of this approach is each optimization window is small enough to solve by branch-and-bound methods.

As illustrated in FIG. 4, the computing system may solve for a particular optimization window 420 by adjusting one or more of the plurality of binary variables during a sub-period, while keeping binary variables in fixed sub-periods 410 constant over the sub-period. As the computing system advances along the period, more sub-periods will be fixed sub-periods 410 until the entire period is optimized. In particular embodiments the computing system may fix one or more binary variables by assigning them a value of zero in a fixed sub-period 410. The computing system may be further programed to generate one or more continuous variables during relaxed sub-periods 430.

In particular embodiments the computing system may relax binary variables based on the current sub-period the computing system is currently optimizing. In particular embodiments the computing system may fix one or more binary variables based on the value of the binary variables in the initial production plan (e.g., fixing binary variables that are valued at zero in the initial production plan). Additional parameters that may control making variables fixed or continuous may include, for example and not by way of limitation, the number of sub-periods that are committed to a particular production, the optimization window size, and the minimum quantity of finished goods to be produced per period or sub-periods.

In particular embodiments the sub-period optimization plan during the first phase may be controlled by the pseudo-code:

```
t_start=1
while(t_start<LAST_PERIOD)
{
    t_end=t_start+optimization_window_size
    Set PRODUCE, startProdPeriod and endProdPeriod
        binary variables to be continuous when for t>t_end
    Solve the MIP formulation by a commercial MIP solver
        with the binary variables fort in [t_start, t_end]
    Let S be solution from the commercial MIP solver.
    Fix PRODUCE=0 for t in [t_start, t_start+num_peri-
        od_to_fix] if PRODUCE has value of zero in S
    t_start=t_start+num_period_to_fix
}
```

Where t_start and t_end are the period index of the beginning and the end of the sub-period. The entire period of the production plan may be defined from 1 to LAST_PERIOD, where LAST_PERIOD is the ending period of the whole model horizon, optimization_window_size defines the number of periods or sub-periods that have binary variables to be optimized (e.g., sub-period 420 in FIG. 4), and num_period_to_fix defines the number of periods in which one or more binary variables are fixed (e.g., sub-period 410 in FIG. 4). These algorithms may define when particular binary variables are set as fixed, relaxed (e.g., continuous), or set for optimization.

Figure 5:
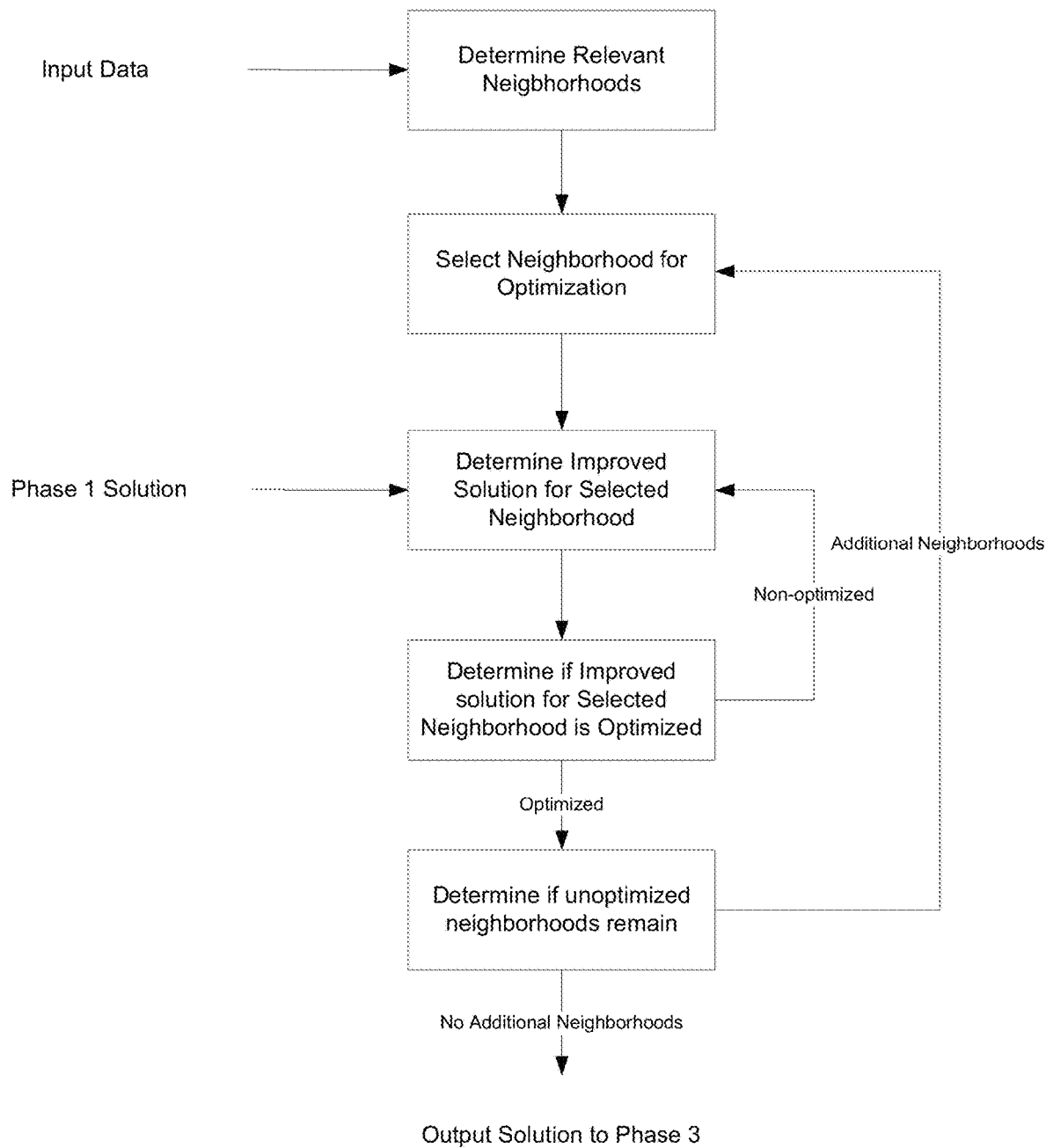
FIG. 5 illustrates a method for conducting a large neighborhood search to generate a neighborhood optimization plan.

FIG. 5 illustrates a method 500 for conducting a large neighborhood search to generate a neighborhood optimization plan. At this second phase of optimization, the computing system may improve upon the sub-period optimization plan by searching for better solutions over the whole model horizon by defining one or more neighborhoods. This approach permits the computing system to generate, using the sub-period optimization plan as input, a neighborhood optimization plan by adjusting one or more of the plurality of binary variables for each of the predefined neighborhoods. The computing system further improves the optimized production plans at this phase by searching for better solutions over the whole period within each individual neighborhood.

At step 510, the computing system may utilize input data to determine one or more relevant neighborhoods for optimization at the second phase. In particular embodiments three relevant neighborhoods may be optimized. A first neighborhood may be defined by grouping modules, equipment, workstations, or assets that can produce the same raw materials and finished goods into a neighborhood (e.g., infrastructure data). A second neighborhood may be defined by grouping raw materials and finished goods which are part of a larger product family (e.g., share a common one or more raw materials comprising the one or more finished goods) into a neighborhood. A third neighborhood may be defined by grouping consecutive periods or sub-periods into a neighborhood.

At step 520, the computing system may be programmed to select a particular neighborhood for optimization.

At step 530 the computing system may be programmed to use the solution from phase one of optimization as an input to determine a neighborhood optimization plan for the selected neighborhood. Binary variables in neighborhoods outside the selected neighborhood may be set as fixed during optimization. In particular embodiments the neighborhood optimization plan during the second phase may be controlled by the pseudocode:

```
no_improvement_in_all_neighbors=false
While (
total running time <maximum_improvement_time
And not no_improvement_in_all_neighours)
{
   no_improvement_in_all_neighbors=true
   for each(neighborhood in the list of neighborhoods){
      Fix the binary variables outside the neighborhood in
         S₁ solution
      Optimize the model with binary variables in the
         neighborhood by a Commercial MIP solver. Maxi-
         mum solving time of this run is set by
         maximum_time_per_solve
      if a better objective cost is found
      {
         Update S₁ solution
         no_improvement_in_all_neighbors=false;
      }
   }
}
```

Where no_improvement_in_all_neighbors is a Boolean indicator which is true when a better objective cost of all neighborhoods is not found, total running time records the length of running time of the computer during the second phase of optimization, maximum_improvement_time is the maximum total runtime of the improvement phase, and maximum_time_per_solve is the maximum time allotted to improve each neighborhood, and $S_1$ is the sub-period production plan generated in phase one (e.g., the output from phase one).

At step 540, the computing system may be programmed to determine if the improved solution for the selected neighborhood is optimized. If not, the computing system may return to step 530 to determine an improved solution for the selected neighborhood. In particular embodiments, optimization may be determined by comparing the CPU clock rate for different neighborhood optimization plans generated at step 530. By comparing the time elapsed to determine a neighborhood optimization plan for the selected neighborhood, the computing system can easily compare production plan generation times regardless of the type of computing device used to perform these processes. In particular embodiments an optimality gap of less than 0.5% of the branch and bound method between iterations may indicate that a neighborhood production plan is optimized for a particular neighborhood. As another example, the computing system may be programed to add a constraint to the network optimization model to guarantee that the total revenue in the subsequent iterations must be greater or equal to the revenue of the previous iteration. The objective of these optimization criteria is to minimize the total change over and inventory cost relative to the first run.

At step 550, if the computing system determined at step 540 the production plan for the selected neighborhood is optimized, the computing system may determine if unoptimized neighborhoods remain. If additional unoptimized neighborhoods remain, the computing system may return to step 520 to select a neighborhood for optimization. If no additional neighborhoods remain, the computing system may output the phase 2 solution for use as in input for optimization in phase three.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for conducting a large neighborhood search to generate a neighborhood optimization plan including the particular steps of the method of FIG. 5, this disclosure contemplates any suitable method for conducting a large neighborhood search to generate a neighborhood optimization plan including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

In particular embodiments the computing system may utilize the neighborhood optimization plans from phase two as the input for optimization under phase three. At phase three, the computing system may be programmed to optimize the neighborhood optimization plan globally within the entire period. This phase focuses on the actual optimization production plans that will be implemented by optimizing a production plan for the time period by adjusting and reoptimizing one or more of the plurality of binary variables over the entire time period. In particular embodiments the criteria for fixing, optimizing, or relaxing various binary variables may be similar to the criteria in phase one.

In particular embodiments generating the optimized production plan during the third phase may be controlled by the pseudocode:

```
Fix binary decision variables as they are in S₂ for
   t>committed_horizon_size.
Optimize the model with free binary variables tor
   t<=committed_horizon_size by Commercial MIP
   Solver.
```

Where $S_2$ is the neighborhood optimization plan generated in phase two (e.g., the output from phase two). and committed_horizon_size is the number of periods that will be reoptimized and t is the index of each time period.

While the figures and examples disclosed herein describe simplistic representations of sites and production plans, it should be appreciated that in some embodiments a site may produce, handle, store, and manufacture hundreds of different finished goods, which may comprise hundreds or even thousands of different types of raw materials. It should be further appreciated that although the methods herein describe production plans and optimized production plans for a particular site, embodiments disclosed herein can provide production plans and optimized production plans that provide for production of a finished good at a plurality of sites, for example, multiple production facilities in a supply chain network. As a result, for complex sites or networks of sites there may exist thousands or even millions of different production plans that are capable of producing a particular quantity of one or more finished goods over a particular time period. As a result, in particular embodiments the computing system may use a heuristic approach and only generate a finite number of production plans necessary to find one or more optimized production plans based on the predetermined criteria. In particular embodiments, the computing system may dynamically release the memory of non-optimal or invalid production plans during or after generating production plans for the particular production of finished goods.

In particular embodiments, the computing system may analyze the one or more optimized production plans to filter and eliminate particular optimized production plans for the site based on one or more site constraints or predetermined filtering criteria, for example and not by way of limitation, a minimum or maximum site production run rate, a desired or minimum utilization rate, desired period-beginning inventory, period-ending inventory, available or protected safety stock, or a standard or expedited release time of a finished good. For example, if there are multiple optimized production plans available, but the consumer desires a minimum level of safety stock of the finished good, the computing system may filter the one or more optimized production plans to produce a reduced subset of optimized production plans that result in the safety stock meeting or exceeding the minimum desired level.

Additionally, the computing system may rank one or more optimized production plans. For example, if the consumer desires one or more optimized production plans that minimizes the cost associated with production, the computing system may rank the optimized production plans based on the cost. As another example, the consumer may desire the fastest production of finished goods, regardless of cost. In contrast, as another example the consumer may desire the cheapest production of finished goods, regardless of time. The input data may comprise any number of defined criteria in order to prioritize the optimized production plans. In particular embodiments the computing system may rank one or more optimized production plans based on one or more criteria.

In particular embodiments the computing system may output one or more optimized production plans that indicate one or more production processes each having a plurality of production process steps, and the quantity of finished goods and raw materials to be produced, manufactured, handled, and stored at a particular site for a particular time period. The output may be suitable for display to a consumer of the production plan (e.g., a corporation that operates the site or a supply chain network) on a client device (e.g., a mobile device, tablet, smartwatch, etc.). In some embodiments the one or more optimized production plans outputted to the user may be a subset of the generated production plans or optimized production plans, based on, for example, one or more filtering criteria. In some embodiments the output may comprise a single top optimized production plan, comprising the optimal operation and production at the site, including the optimal quantity of finished goods and raw materials be produced, manufactured, handled, and stored at a particular site for a particular time period. In some embodiments the output may comprise multiple optimized production plans, comprising multiple options for operation of the site that obtains an optimal or near-optimal fulfillment of a particular quantity of finished goods and raw materials based on the defined filtering or ranking criteria. In other embodiments, the output may merely comprise a portion of an optimized production plan, for example a particular finished good that must be manufactured using particular equipment at the site, but leaving the remaining decisions up to the consumer of the optimized production plans. In particular embodiments it may not be necessary to output every production plan or optimized production plan. In this situation, rather than find an optimal solution, the computing system may be programmed to take a heuristic approach, outputting enough production plans to provide a near-optimal or serviceable solution. In particular embodiments the output may comprise summary information for each production plan or optimized production plan. This information may include details regarding quantity of finished goods/raw materials that must be produced, manufactured, handled, and stored during the time period, and starting and ending finished goods or raw materials inventory for the site, specific costs associated with operation, equipment, workstations, module, or worker capacity, estimated time to manufacture a finished good, site utilization and production rates, the resulting inventories of finished goods at the site at the end of the period, and any other information relevant to the consumer's determination of which production plan to use to produce the particular quantity of the one or more finished goods over the time period.

In particular embodiments the computing system may be programmed to further transmit, to one or more computers associated with the site, or one or more additional sites in a supply chain network (e.g., a supplier or vendor that the site receives raw materials from), a plurality of signals to initiate movement of one or more of the raw materials or finished goods to or from the particular site. The signals may further provide instructions necessary to procure finished goods or raw materials necessary to implement the optimized production plan, including for example logistical details regarding the movement of finished goods or raw materials. In particular embodiments the computing system may only transmit a plurality of signals to one or more computers associated with one or more sites that are considered to be the most critical in fulfilling the order based on the predetermined criteria. For example, if implementation of the production plan is time-sensitive, the computing system may transmit a plurality of signals to one or more sites that are capable of providing finished goods or raw materials in the shortest amount of time.

Figure 6:
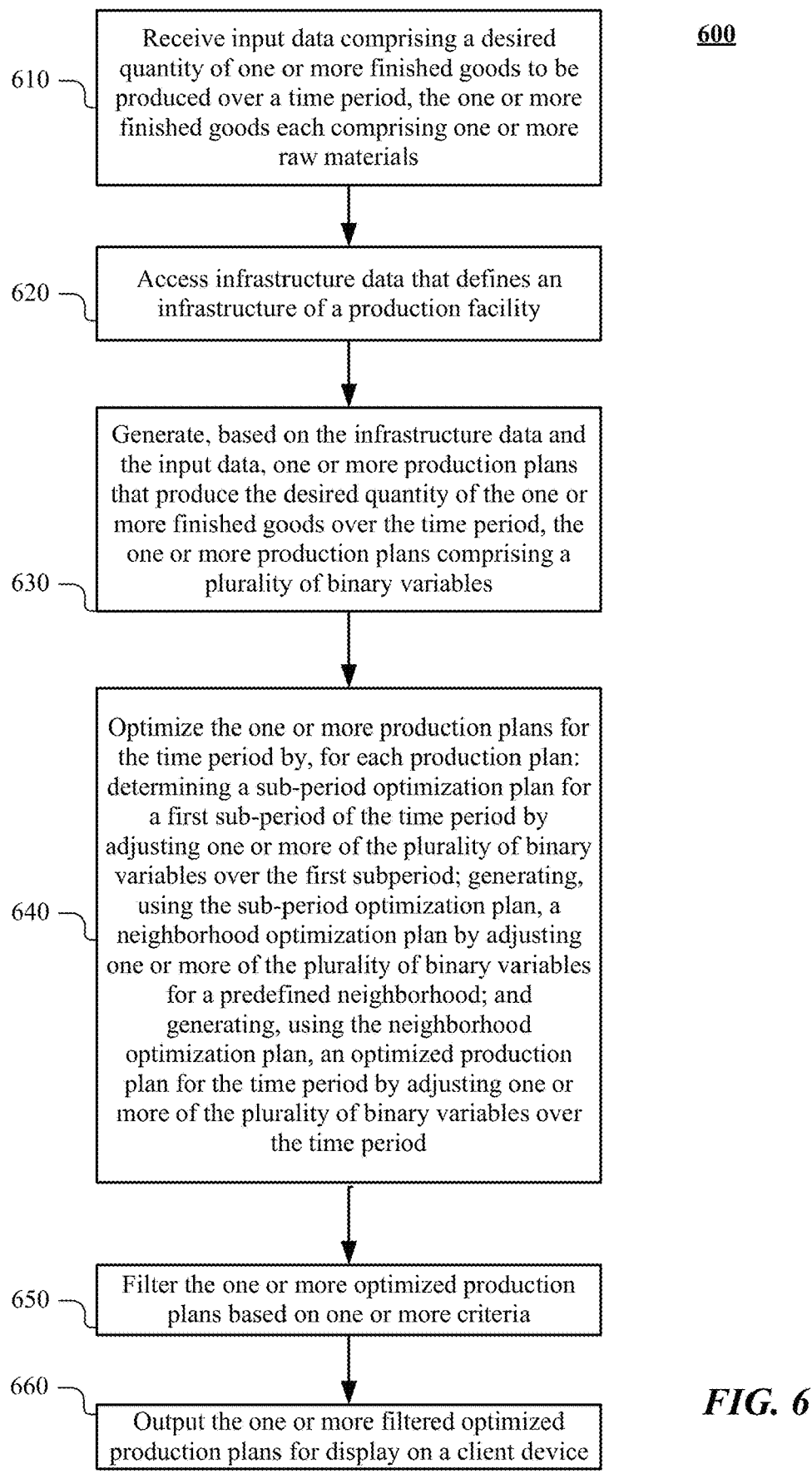
FIG. 6 illustrates an example method to determine one or more optimal production plans solutions that provide real-time response to a production planning query concerning a production of physical products in a plurality of production processes each having a plurality of production process steps, production periods, and production facilities, each of the production process steps having multiple changeover cost values and inventory cost values.

FIG. 6 illustrates an example method to determine one or more optimal production plans solutions that provide real-time response to a production planning query concerning a production of physical products in a plurality of production processes each having a plurality of production process steps, production periods, and production facilities, each of the production process steps having multiple changeover cost values and inventory cost values.

In the example of FIG. 6, a method 600 may begin execution at step 610, where a computing system is programmed to receive input data comprising a particular quantity of one or more finished goods over a time period, the one or more finished goods each comprising one or more raw materials, bill of materials for each finished good and raw materials. For example, the input techniques for receiving data previously described in connection with FIG. 1B may be used.

At step 620 the computing system is programmed to access infrastructure data that defines an infrastructure of a particular production facility among the plurality of production facilities.

At step 630, the computing system is programmed to generate, based on the infrastructure data and the input data, one or more production plans that produce the particular quantity of the one or more finished goods over the time period, the one or more production plans comprising a plurality of binary variables including at least the changeover cost values and the inventory cost values.

At step 640, the computing system is programmed to, based on the one or more production plans, calculate one or more optimized production plans for the time period by, for each of the optimized production plans determining a sub-period optimization plan for a first sub-period of the time period by adjusting one or more of the plurality of binary variables over the first subperiod; generating, using the sub-period optimization plan, a neighborhood optimization plan by adjusting one or more of the plurality of binary variables for a predefined neighborhood; and generating, using the neighborhood optimization plan, a particular optimized production plan for the time period by adjusting one or more of the plurality of binary variables over the time period.

At step 650, the computing system is programmed to filter the one or more optimized production plans based on one or more filtering criteria to produce a reduced subset of the optimized production plans.

At step 660, the computing system is programmed to output the reduced subset of the optimized production plans for display on a client device. Based upon the quantity of data that is input at step 610 for a complex supply chain network, and the complexity of the calculations involved in creating production plans from the data, then optimizing the production plans according to neighborhoods, given the number of variables involved, the method of FIG. 6 provides a practical application of computing technology by transforming the input data in ways that have not been possible using manual approaches and by presenting the output data in a manner that permits selecting or using the one or more optimized production plans. The number of binary variables involved in complex supply chain networks is far too large to enable mental calculation of a set of multiple optimized production plans based upon different analytical factors, or a solution in reasonable time to make production decisions in response to changing supply conditions, necessitating a machine calculation solution. The algorithmic techniques herein have been found, by the inventors in an inventive moment, to represent a particularly efficient and practical way to assess a large quantity of data for a complex supply chain network and to generate specific production plans that can control facilities to reduce the excess use of resources, machine time, or changes in production line elements. The techniques can produce real-time response as input data changes, even with large-scale datasets representing highly complex supply chains. The techniques disclosed herein enable calculating specific production plans that can be applied to the operation of distribution centers, suppliers, vendors, and manufacturers, including modules, equipment, workstation, or other assets at one or more sites, to produce different and more efficient operation of those elements to achieve specified goals.

In an embodiment, with or without step 660, the method of FIG. 6 may further comprise: receiving an input signal that selects a particular optimized production plan from among the reduced subset of the optimized production plans; extracting, from the particular optimized production plan, values for all binary variables in that particular production plan; transmitting, to one or more site computers of sites associated with the particular optimized production plan, values of the binary variables that have been extracted; using the one or more site computers, controlling an associated site to: constrain one or more modules, assets, or equipment at the associated site to produce only one finished good during a time period; to limit the size and number of campaigns during a particular time period. Therefore, a particular optimized production plan, calculated according to FIG. 6 and as otherwise described in this disclosure, may directly affect the physical arrangement and utilization of specific facilities in a supply chain.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for determine one or more optimal path solutions based on the determined cost associated with the one or more path fragments including the particular steps of the method of FIG. 6, this disclosure contemplates any suitable method for determine one or more optimal path solutions based on the determined cost associated with the one or more path fragments including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
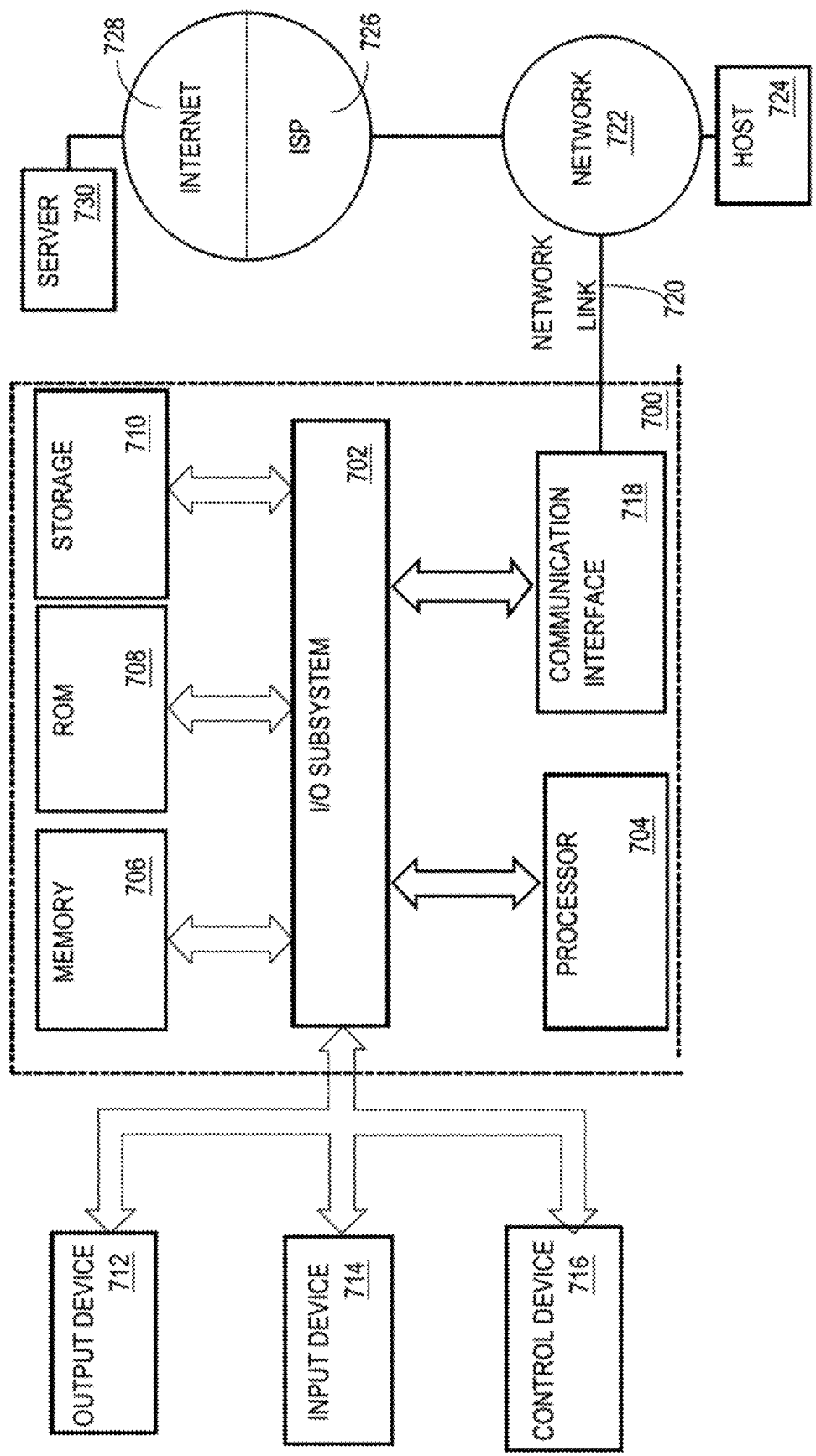
FIG. 7 illustrates a block diagram that illustrates an example computer system with which an embodiment may be implemented.

FIG. 7 illustrates a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (INU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or no SQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

4. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of providing real-time response to a production planning query concerning a sequence-dependent production of physical products in a plurality of production processes each having a plurality of production process steps, production periods, and production facilities, each of the production process steps having multiple changeover cost values and inventory cost values, the method being executed using one or more processors and comprising:

receiving input data comprising a particular quantity of one or more finished goods to be produced by the plurality of production facilities over a time period, the one or more finished goods each comprising one or more raw materials;

accessing infrastructure data that defines an infrastructure of a particular production facility among the plurality of production facilities;

generating, based on the infrastructure data and the input data prior to one more changes to the input data or infrastructure data, one or more sequence-dependent production plans that produce the particular quantity of the one or more finished goods over the time period through a particular sequence of one or more production process steps of the plurality of production process steps, the one or more production plans comprising a plurality of binary variables including at least the changeover cost values and the inventory cost values;

based on the one or more production plans, calculating, prior to receiving a subsequent change to the input data or infrastructure data, one or more optimized production plans, wherein the optimized production plan is optimized for profitability by, for each of the production plans:

determining a sub-period optimization plan for a first sub-period of the time period by adjusting one or more of the plurality of binary variables over the first sub-period, and fixing one or more of the plurality of binary variables over the first sub-period, wherein one or more of the plurality of binary variables are fixed based on having a value of zero in the first sub-period optimization plan;

generating, using the sub-period optimization plan, a neighborhood optimization plan by adjusting one or more of the plurality of binary variables for a predefined neighborhood; and generating, using the neighborhood optimization plan, a particular optimized production plan for the time period by adjusting one or more of the plurality of binary variables over the time period;

filtering, for each facility among the plurality of production facilities, the one or more optimized production plans based on one or more filtering criteria specific to each production facility to produce a reduced subset of the optimized production plans for each facility; and transmitting, to each facility among the plurality of production facilities, the reduced subset of the optimized production plans for display on a client device and one or more signals to initiate movement of the one or more raw materials or the one or more finished goods between one or more of the plurality of production facilities.

2. The method of claim 1, the infrastructure data comprising a quantity of workstations in the production facility, wherein the generated production plans define a sub-quantity of finished goods to be produced on each of the quantity of workstations.

3. The method of claim 2, the one or more optimized production plans further comprising one or more production periods that define a duration during which a finished good is produced at a particular workstation of the quantity of workstations, wherein the one or more optimized production plans are ranked for each facility among the plurality of production facilities based on the duration of the one or more production periods.

4. The method of claim 1, the determining a sub-period optimization plan for a first sub-period of the time period further comprising generating one or more continuous variables, wherein the generated continuous variables are based on the duration of the first sub-period.

5. The method of claim 1, the one or more filtering criteria comprising a release time of the one or more finished goods; a safety stock of the one or more finished goods; a desired production rate of the production facility; or a utilization rate of the manufacturing site.

6. One or more computer-readable non-transitory storage media embodying software that is operable when executed to:
receive input data comprising a particular quantity of one or more finished goods to be produced by a plurality of production facilities over a time period, the one or more finished goods each comprising one or more raw materials;
access infrastructure data that defines an infrastructure of a particular production facility among the plurality of production facilities;
generate, based on the infrastructure data and the input data prior to one more changes to the input data or infrastructure data, one or more sequence-dependent production plans that produce the particular quantity of the one or more finished goods over the time period through a particular sequence of one or more production process steps of the plurality of production process steps, the one or more production plans comprising a plurality of binary variables including at least the changeover cost values and the inventory cost values;
based on the one or more production plans, calculate, prior to receiving a subsequent change to the input data or infrastructure data, one or more optimized production plans, wherein the optimized production plan is optimized for profitability by, for each of the production plans:
determining a sub-period optimization plan for a first sub-period of the time period by adjusting one or more of the plurality of binary variables over the first sub-period, and fixing one or more of the plurality of binary variables over the first sub-period, wherein one or more of the plurality of binary variables are fixed based on having a value of zero in the first sub-period optimization plan;
generating, using the sub-period optimization plan, a neighborhood optimization plan by adjusting one or more of the plurality of binary variables for a pre-defined neighborhood; and
generating, using the neighborhood optimization plan, a particular optimized production plan for the time period by adjusting one or more of the plurality of binary variables over the time period;
filter, for each facility among the plurality of production facilities, the one or more optimized production plans based on one or more filtering criteria specific to each facility to produce a reduced subset of the optimized production plans for each production facility; and
transmit to each facility among the plurality of production facilities the reduced subset of the optimized production plans for display on a client device and one or more signals to initiate movement of the one or more raw materials or the one or more finished goods between one or more of the plurality of production facilities.

7. The media of claim 6, the infrastructure data comprising:
a quantity of workstations in the production facility, wherein the generated production plans define a sub-quantity of finished goods to be produced on each of the quantity of workstations.

8. The media of claim 6, the one or more optimized production plans further comprising:
one or more production periods that define a duration during which a finished good is produced at a particular workstation of the quantity of workstations, wherein the one or more optimized production plans are ranked for each facility among the plurality of production facilities based on the duration of the one or more production periods.

9. The media of claim 8, wherein determining a sub-period optimization plan for a first sub-period of the time period further comprises generating one or more continuous variables, wherein the generated continuous variables are based on the duration of the first sub-period.

10. The media of claim 8, the one or more filtering criteria comprising:
a release time of the one or more finished goods;
a safety stock of the one or more finished goods;
a desired production rate of the production facility; or
a utilization rate of the manufacturing site.

11. A system comprising:
one or more processors; and
one or more computer-readable non-transitory storage media coupled to one or more of the processors and comprising instructions operable when executed by one or more of the processors to cause the system to:
receive input data comprising a particular quantity of one or more finished goods to be produced by a plurality of production facilities over a time period, the one or more finished goods each comprising one or more raw materials;
access infrastructure data that defines an infrastructure of a particular production facility among the plurality of production facilities;
generate, based on the infrastructure data and the input data prior to one more changes to the input data or infrastructure data, one or more sequence-dependent production plans that produce the particular quantity of the one or more finished goods over the time period through a particular sequence of one or more production process steps of the plurality of production process steps, the one or more production plans comprising a plurality of binary variables including at least the changeover cost values and the inventory cost values;
based on the one or more production plans, calculate, prior to receiving a subsequent change to the input data or infrastructure data, one or more optimized production plans, wherein the optimized production plan is optimized for profitability by, for each of the production plans:
determining a sub-period optimization plan for a first sub-period of the time period by adjusting one or more of the plurality of binary variables over the first sub-period, and fixing one or more of the plurality of binary variables over the first sub-period, wherein one or more of the plurality of binary variables are fixed based on having a value of zero in the first sub-period optimization plan;
generating, using the sub-period optimization plan, a neighborhood optimization plan by adjusting one or more of the plurality of binary variables for a pre-defined neighborhood; and
generating, using the neighborhood optimization plan, a particular optimized production plan for the time period by adjusting one or more of the plurality of binary variables over the time period;

filter, for each facility among the plurality of production facilities, the one or more optimized production plans based on one or more filtering criteria specific to each facility to produce a reduced subset of the optimized production plans for each production facility; and transmit to each facility among the plurality of production facilities the reduced subset of the optimized production plans for display on a client device and one or more signals to initiate movement of the one or more raw materials or the one or more finished goods between one or more of the plurality of production facilities.

12. The system of claim 11, wherein the infrastructure data comprises:
   a quantity of workstations in the production facility, wherein the generated production plans define a sub-quantity of finished goods to be produced on each of the quantity of workstations.

13. The system of claim 11, wherein determining a sub-period optimization plan for a first sub-period of the time period further comprises generating one or more continuous variables, wherein the generated continuous variables are based on the duration of the first sub-period.

14. The system of claim 11 the one or more filtering criteria comprising:
   a release time of the one or more finished goods;
   a safety stock of the one or more finished goods;
   a desired production rate of the production facility; or
   a utilization rate of the manufacturing site.

* * * * *